Dec. 1, 1964

S. B. BEECHER 3,159,126

WELDING SUPPORTING APPARATUS

Filed May 31, 1961

INVENTOR.
STANLEY B. BEECHER
BY
Byron, Hume, Green & Clement
ATTYS.

Dec. 1, 1964  S. B. BEECHER  3,159,126
WELDING SUPPORTING APPARATUS

Filed May 31, 1961  2 Sheets-Sheet 2

INVENTOR.
STANLEY B. BEECHER
BY
*Byron, Hume, Groen & Clement*
ATTYS.

# 3,159,126
Patented Dec. 1, 1964

3,159,126
WELDING SUPPORTING APPARATUS
Stanley B. Beecher, Chicago, Ill., assignor to Union Tank Car Company, Chicago, Ill., a corporation of New Jersey
Filed May 31, 1961, Ser. No. 113,796
7 Claims. (Cl. 113—99)

This invention relates in general to apparatus for handling a spherical object while performing work on its surface. It deals more specifically with a device for supporting, positioning and rotating large spherical containers while welding seams in the containers.

An object of the invention is to provide a new and improved device for assisting in the welding of seams in a segmented spherical container.

Another object is to provide a device for rotating a segmented large spherical container while welding the seams in the container in a horizontal or flat position.

Yet another object is to provide a device for facilitating the welding of all the seams in a large spherical container which lie in a great circle of the container.

Still another object is to provide a device of the afore-described character which aids in rapidly welding a series of variously oriented seams in a segmented large spherical container.

A further object is to provide a device which readily supports, positions and repositions and rotates spherical containers of great size and weight.

Another object is to provide a new and improved method for welding seams in large segmented spherical containers.

The above and other objects are realized in accordance with the present invention by providing a new and improved device for positioning a segmented sphere having unwelded seams in predetermined relationship to welding means and rotating the sphere in the plane of each seam while welding it. Briefly the invention contemplates placing a large spherical container having great circle seams to be welded on a device including support means engaging said sphere along a small circle thereof. The device is positioned in predetermined relation to the seam in question and it rotates the sphere while a welding operation is performed along the seam. In moving to another seam the apparatus retreats from the sphere, is repositioned and then rotates the sphere again along the last mentioned seam. The welding operation is readily performed in a flat position at all times, either inside the sphere at its bottom or outside of it and on top, for example.

The invention, both as to its organization and method of operation, taken with further objects and advantages thereof, will best be understood by reference to the following description taken in connection with the accompanying drawings, in which:

FIGURE 3 is a further enlarged front view taken along line 3—3 of FIGURE 2 showing a portion of the spherical container;

FIGURE 5 is a front view, with parts broken away, of a sphere supporting column.

Figure 1:
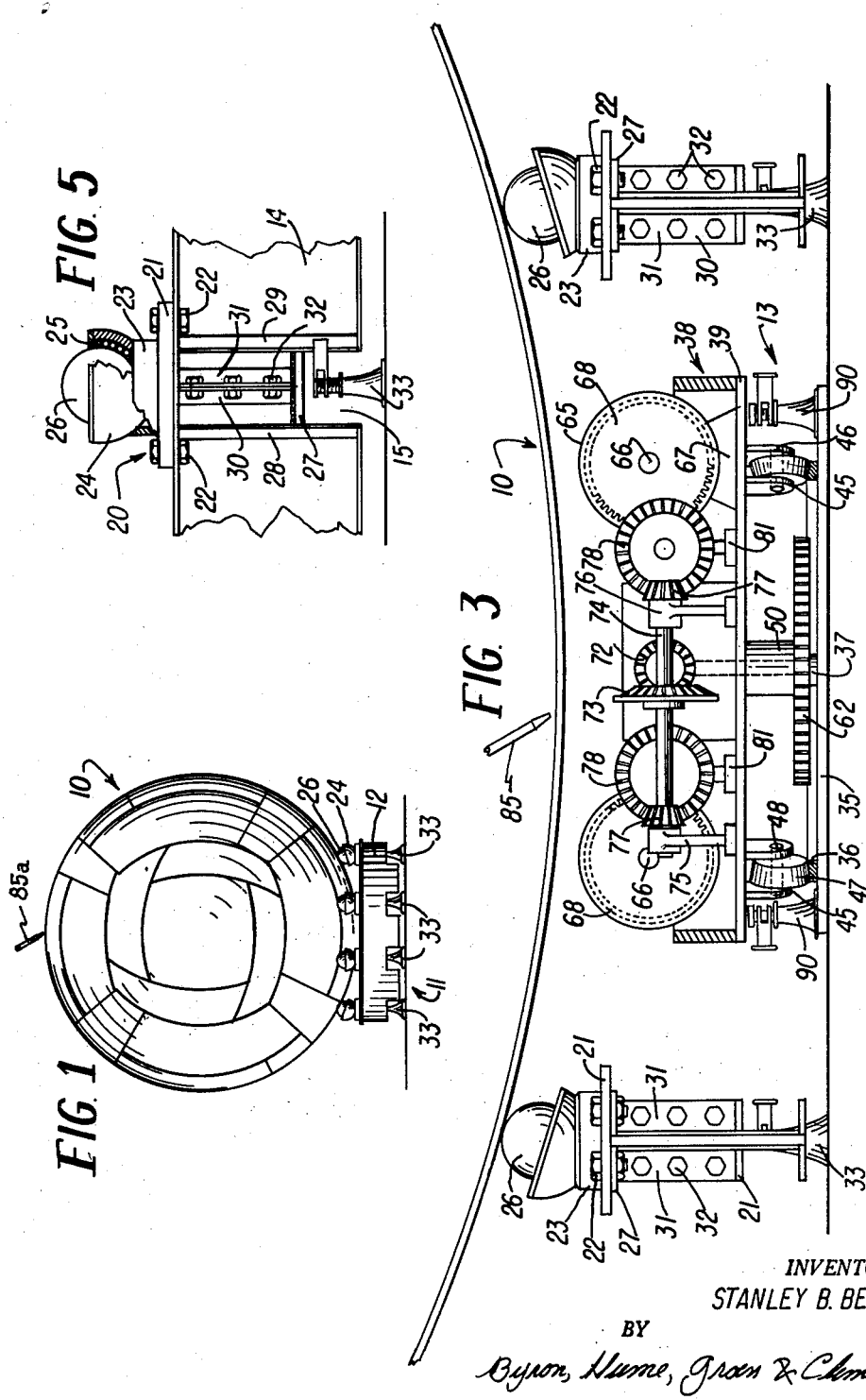
FIGURE 1 is a front elevational view of apparatus embodying the invention supporting a segmented spherical container in position for welding.

Referring to the drawings, and particularly to FIGURE 1, a segmented spherical container is shown generally at 10. Container 10 is supported by apparatus 11 embodying this invention. The apparatus is adapted to position the sphere and rotate it while its seams are welded. It supports the container and rotates it along predetermined seams during the welding of each seam. The various segments of the sphere are initially held together by any well known method as the container is assembled. This might be by spot welding or a framework of support bars, for example. This assembly is supported by the apparatus 11. In facilitating the welding of various seams of a large segmented spherical container, the apparatus embodying this invention rotates the sphere along a specified seam and welding is accomplished on the seam as it rotates. It is readily repositioned after the seam in question is welded and aligned with another seam. In conjunction with this, it readily repositions the sphere in any manner to permit this alignment. Having aligned the latter seam it rotates the sphere in another great circle plane while another seam is welded. This procedure is continued until each of the seams in the spherical container is uniformly welded providing a fluid-tight container.

More specifically, the apparatus 11 embodying this invention includes a sphere support framework 12, seen in FIGURE 1, and a positioning, rotating and welding assembly 13 mounted within the confines of the framework. As is readily apparent in the light of the foregoing brief description, the framework 12 is adapted to support the large spherical container 10 in predetermined relationship to assembly 13 while the assembly positions and rotates the container.

Figure 2:
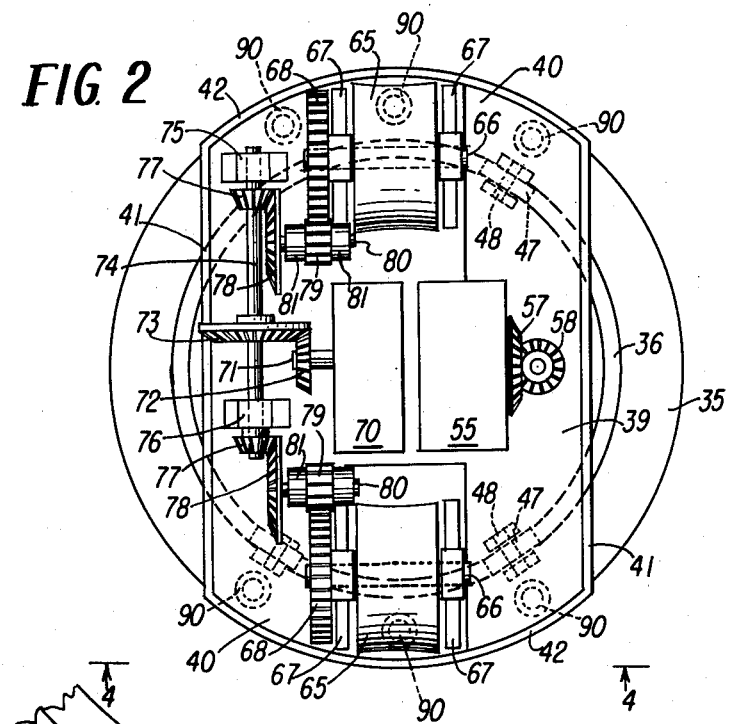
FIGURE 2 is an enlarged plan view of the apparatus with parts broken away.

Framework 12 is generally ring shaped in plan view, a portion of the ring being illustrated best in FIGURE 2. It comprises an I-beam 14 formed into what approximates a circle. The lower edge of beam 14 is provided with a series of regularly spaced cut-outs 15. At each cut-out, and consequently also regularly spaced around the ring, a support column 20 is mounted.

Each support column 20 includes an upper support plate 21 secured to the upper flange of the I-beam 14 by conventional means such as bolts 22, for example. On top of each plate 21 is secured a mounting ring 23 in which cup shaped element 24 is movably seated. Cup shaped element 24 is lined with roller bearings 25 which in the instant application comprise two inch steel ball bearings. Seated in each cup element 24 and on the ball bearings 25 are steel support balls 26 which are in the neighborhood of 15 inches in diameter. It will be understood, of course, that the balls 26 and the ball bearings 25 might vary in diameter depending upon the size of containers to be handled and these particular dimensions are given only as examples. With balls of this size in a framework of compatible size, spherical containers 50 feet in diameter are readily handled.

Each column 20 further includes a lower support plate 27 which is welded in a corresponding cut-out 15 in the lower edge of I-beam 14. It is also welded to opposed pairs of angle irons 28 and 29 secured on opposite sides of the beam. The angle irons 28 and 29 are secured to I-beam 14 by conventional means, which might be welding also. As added support between the lower plate 27 and the upper plate 21, back-to-back angle irons 30 and 31 are welded to each plate and to the web portion of I-beam 14, as shown in FIGURE 5. The angle irons 30 and 31 are secured together by bolts 32.

Screw type jacks 33 of well known construction are placed under each of the lower steel plates 27. They adjustably support framework 12 and consequently control the height of the spherical container 10. The container can be raised, lowered and leveled at will. The jacks also facilitate lowering framework 12 to the ground for dismantling after permanent supports for the completed sphere are installed.

Though the specific construction of framework 12, described above, including screw jacks 33, has been found highly satisfactory, it is not intended to limit the invention to any particular framework construction. For example, a circular girder or concrete piers carrying rotatably mounted support balls 26 might be utilized. Jacks 33 might be eliminated. The primary consideration is to provide means for satisfactorily supporting the weight of a large and heavy sphere.

The positioning and rotating assembly 13 is situated within the confines of the support framework 12, as has been previously pointed out. Assembly 13 positions the spherical container such that any seam to be welded lies in a plane perpendicular to the generally horizontal plane of the assembly. The assembly rotates the container in the first mentioned plane such that it can be welded along the seam. It repositions the container while the container is supported above it and rotates the container in a new plane while another seam is welded.

The assembly 13 includes a circular base plate 35 adapted to be mounted on a concrete floor, for example. The base plate 35 has a bevelled circular track 36 extending around it near its periphery. A guide pin 37 extends upwardly from the plate 35 adjacent its center.

The assembly 13 further includes a turntable 38 adapted to rotate about pin 37. Turntable 38 comprises a floor 39 of elongated, generally rectangular shape, having opposed ends 40 rounded in an arc coincident with the arc of the circular base plate 35. Side walls 41 extend upwardly from the longitudinal edges of floor 39 and walls 42 are joined to floor 39 and walls 41 by conventional means to form a tray. Depending from the tray, and best illustrated in FIGURES 2 and 3, are four pairs of ears 45, 46 (only two of which are visible). Bevelled wheels 47 carried on axle pins 48 are supported between the lower ends of the depending ears 45, 46. The wheels 47 are complementary with and adapted to ride on bevelled track 36. Guide sleeve 50 depends from the center of floor member 39 and fits in bearing relationship over upstanding guide pin 37 to establish an axis of rotation for the turntable 38. It will be apparent that the turntable is mounted in this manner for rotation on track 36 about guide pin 37.

Figure 4:
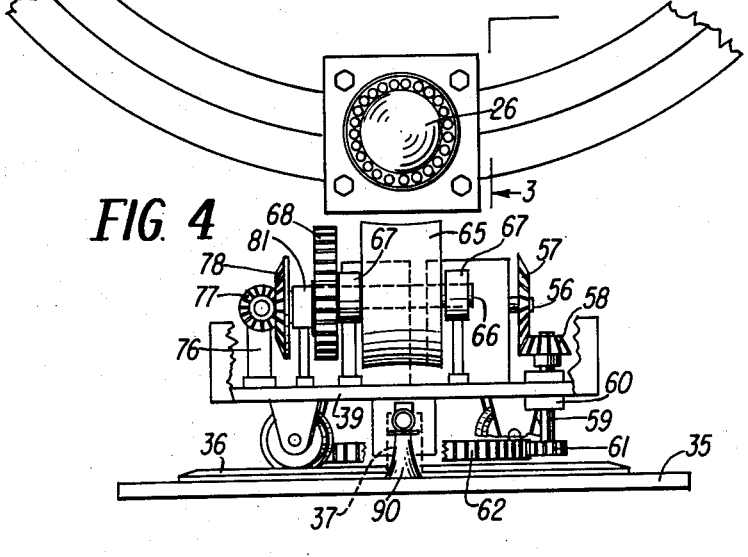
FIGURE 4 is a side view taken along line 4—4 of FIGURE 2, with parts broken away.

Turntable 38 is rotated about guide pin 37 by a power source and drive control 55 seated on floor 39 of the turntable. The power source and drive control might be a conventional electric motor with suitable control equipment, for example. As best seen in FIGURE 4, a drive shaft 56 extends transversely of the power source and drive control 55 and carries at its outer extremity a bevel gear 57. Bevel gear 57 meshes with a bevel gear 48 mounted on a shaft 59 extending through and held in bearing 60 in the floor 39 of turntable 38. A suitable spur gear 61 at the lower end of shaft 59 meshes with a ring gear 62 secured to guide pin 37.

Drive rolls 65 for rotating the large spherical container 10 are mounted on the turntable floor 39 at opposite ends of the floor. Each drive roll is supported on a transversely extending drive shaft 66 rotatably mounted in opposed pillow blocks 67. The shafts 66 in turn carry ring gears 68 affixed to corresponding ends of each shaft for rotation with the shaft.

A power source and drive control 70 for the drive rolls 65 is mounted on the floor 39 of turntable 38 adjacent power source and drive control 55. As best seen in FIGURE 2, a drive shaft 71 extends transversely from power source and drive control 70 and carries a bevel gear 72 adjacent its outer extremity. Bevel gear 72 meshes with a bevel gear 73 affixed to shaft 74 rotatably mounted in bearing supports 75 and 76. Adjacent these bearing supports the shaft carries small bevel gears 77. Immediately adjacent small bevel gears 77 and in mesh with them are bevel gears 78 mounted for rotation, along with spur gears 79 on shaft 80. Shaft 80 extends transversely of shaft 74 and is mounted for rotation in bearing supports 81. As is readily seen in FIGURE 2, the spur gears 79 mesh in driving relationship with ring gears 68 affixed to drive roll supporting shafts 66. Through the aforedescribed gear chain, the drive rolls 65 can be driven and controlled for rotation in either direction at varying speeds by power source and drive control 70.

Welding equipment 85 is shown inside and at the bottom of container 10 in FIGURE 3. It might be a conventional torch, as shown, or a more sophisticated automatic welding device. At any rate, it will be readily seen that the inside seam welding is accomplished in a horizontal or flat position. In keeping with this intent, the outside seam welding might be performed from a framework above the container. A conventional welding torch 85a is shown in FIGURE 1 adjacent the top of container 10 on the outside. Again, the showing is exemplary and other equipment might be utilized. The details of the welding equipment form no part of the invention.

The turntable 38, carrying drive rolls 65 and power means 70 for rotating the rolls at predetermined speed can be raised into engagement with a segmented spherical container 10 by a series of conventional screw type jacks 90. Jacks 90 are rigidly mounted on base plate 35 around its periphery and extend into close proximity with the floor 39 of turntable 38. The positioning of the jacks 90 about the periphery of the base plate 35 is best illustrated in dotted lines in FIGURE 2. As will be seen, three jacks 90 are provided at either end of the turntable 38, however, it is conceivable that more or less might be utilized. In addition, although specific drive means for rotating the turntable 38 have been described, it will be understood that other power sources and drive chains might be used with like results. Similarly, expansible means other than jacks 90 might readily be adapted to raise, lower and support drive rolls 68 without departing from the theme of the invention.

A pre-assembled large spherical container 10 comprising many segments of steel plate rests on 15 inch steel balls 26, in the manner shown in FIGURE 3, before the assembly 13 engages it and its many seams are welded. The series of balls 26, mounted around the periphery of support framework 12, contact the container 10 on a small circle of the sphere. At this time all of the weight of the container, in this case the weight of a hollow steel plate container of approximately 50 feet in diameter, rests on the balls 26.

To move the container into position such that a preselected seam is in position to be welded by welding device 85, the turntable 38 is caused to turn about guide pin 37 on base plate 35 into a predetermined position relative to the seam. This turning of turntable 38 is facilitated by power source and drive control 55. Drive shaft 59, through spur gear 61 at its lower end, propels itself around the ring gear 62 secured to the guide pin 37. This, of course, rotates turntable 38 about the guide pin 37 and into the aforementioned prescribed relationship with the seam in question. Since the upper ends of jacks 90 are spaced slightly from floor 39 in the turntable 38, the turntable turns unimpeded by the jacks 90.

When the turntable 38 is in proper position, such that the plane of rotation of the center of the drive rolls 65 lies in the plane of the great circle seam to be welded, the jacks 90 raise the turntable uniformly on each end and bring the rolls 65 into contact with the outer surface of the container. As the turntable is raised, the guide sleeve 50 on turntable floor 39 slides up guide pin 37. The overlap of the sleeve and pin is sufficient, however, to prevent disengagement before the rolls 65 contact the surface of the container 10. This sleeve and pin relationship establishes and maintains the alignment and positioning of the turntable 38. Wheels 47, of course, leave the track 36 and at the same time spur gear 61, in the turntable gear train, moves upwardly and disengages from ring gear 62 affixed to the guide pin 37.

The turntable 38 is raised sufficiently to cause the rolls 65 to support a certain amount of the weight of the container 10. This, of course takes some of the load off of the supporting balls 26 in the container support framework 12. Thus, the drive rolls 65 support a portion of the weight of the container 10 while the container supporting framework 12 supports the rest. Sufficient weight is supported by the drive rolls to provide good traction between the rolls and the surface of the sphere and the operator of the apparatus 11 by manipulating the power source and drive control 70 for the rolls 65, can rotate the spherical container 10 along the plane of the aforementioned great circle seam while welding is effected. The speed of the rolls might be remotely controlled by the operator within the container, for example, through the power source and control device 70.

To reposition assembly 13 for welding another great circle seam of the spherical container 10, jacks 90 are operated to lower the turntable onto the track 36 wherein spur gear 61 in the turntable gear train remeshes with ring gear 61 on guide pin 37. Through manipulation of the power means and drive control 55 for the turntable, the turntable is rotated into the plane of the last mentioned seam and jacks 90 operated to raise the turntable and consequently rolls 65 into engagement with the spherical container 10. Rotating of the sphere by the drive rolls 65 begins again and the welding operation is repeated on the last mentioned seam.

Under certain circumstances, it may be desirable for a positioning and rotating assembly such as assembly 13 to carry the full weight of the spherical container while rotating it. In such case the support framework for the container 10 might be merely a ring or a series of fixed support posts, the balls 26 being eliminated. The rolls 65 would then raise the container out of engagement with the support framework and rotate it supported solely by the rolls 65. In any case, the operation of the assembly 13 would be substantially the same.

The supporting, positioning and rotating apparatus 11 which has been described has greatly simplified the manufacture of large spherical containers for use as fluid storage tanks. It permits the handling of very large segmented spherical containers with consummate ease and quickly and efficiently facilitates the welding of each of the great circle seams in a container. All of the welding can be accomplished in a horizontal or flat position, insuring uniformly superior results.

The apparatus 11 is substantially more efficient than any generally similar device heretofore known. Once the preassembled spherical container 10 is positioned on the support framework 12, it is not handled by other equipment or subject to other operations until each seam in uniformly welded. One man can readily operate the apparatus and weld containers of great size without additional help. The quality and gauge of the welds is easily controlled within predetermined limits by control of the speed of the drive rolls 65 and welding equipment 85. The apparatus 11, in essence, facilitates high quality welding of the great circle seams in a segmented circle container with a minimum of effort and expense.

While the embodiment described herein is at present considered to be preferred, it is to be understood that various modifications and improvements may be made therein, and it is intended to cover in the appended claims all such modifications and improvements that fall within the true spirit and scope of the invention.

What is desired to be claimed and secured by Letters Patent of the United States is:

1. A device for facilitating the treating of the surface of a sphere comprising means for rotatably supporting the sphere prior to, during, and after treatment of the sphere, means independent of said supporting means for rotating the sphere, means drivingly connected to said rotating means to actuate said rotating means, rotatable frame means from which said rotating means are supported for orienting said rotating means relative to said sphere in one of a plurality of positions, and means supported from said frame means and operable to move said rotating means into and out of engagement with said sphere to cause selected movement of said sphere when supported by said supporting means.

2. The device of claim 1 further characterized in that said rotating means includes a plurality of rollers.

3. A device for facilitating the welding of seams in a large spherical container comprising fixedly spaced apart means for rotatably supporting the container prior to, during, and after welding of the container, means adapted to rotate the container along any of its great circles, rotatable frame means for supporting said rotating means to orient said rotating means in one of a plurality of preselected positions to effect rotation of said sphere along one of a plurality of its great circles, and means operable to move said rotating means into engagement with said sphere, said rotating means and supporting means jointly supporting said sphere during its rotation under the control of said rotating means.

4. The device of claim 3 wherein there is additionally provided means for driving said rotating means and said rotatable frame means.

5. The device of claim 3 further characterized in that said operable means is adapted to raise said rotating means sufficiently to take a portion of the weight of the container off said supporting means.

6. A device for facilitating the welding of seams in a large segmented spherical container comprising a support framework adapted to rotatably support the container on a small circle of the container, a positioning and rotating assembly within the confines of said framework, said assembly including base means, a turntable rotatably mounted on base means, a pair of roller means mounted on said turntable in spaced relationship, drive means between said base means and said turntable for rotating said turntable about an axis passing through the center of the supported spherical container, expansible means between said turntable and said base means adapted to raise said turntable into position such that said roller means drivingly engage and support a portion of the weight of the container, and drive means mounted on said turntable for rotating said rollers and the spherical container in the plane of a predetermined great circle seam on the container to permit welding of the container while the container is supported by said framework.

7. A device for facilitating the welding of seams in a large segmented spherical container comprising a support framework adapted to rotatably support the container on a small circle of the container prior to, during, and after welding operation, a positioning and rotating assembly within the confines of said framework, said assembly including base means, a turntable rotatably mounted on base means, a pair of roller means including supporting structure mounted on said turntable in spaced relationship thereto and adapted to drivingly engage said container, drive means between said base means and said turntable for rotating said turntable about an axis passing through the center of the supported spherical container before the welding operation to orient the container in a predetermined position, expansible means between said turntable and said base means adapted to raise said turntable into position such that said roller means drivingly engage and support a portion of the weight of the container, and drive means mounted on said turntable for rotating said rollers and the spherical container in the plane of a predetermined great circle seam on the container to permit welding of the container while the container is supported by said framework.

References Cited in the file of this patent

FOREIGN PATENTS 129,765    U.S.S.R. _____ Mar. 27, 1959